(12) United States Patent
Lee

(10) Patent No.: US 8,899,595 B2
(45) Date of Patent: Dec. 2, 2014

(54) GASKET MOUNTED BETWEEN POWER MODULES FOR SEPARATING COOLANT PASSAGE

(71) Applicant: Hyundai Mobis Co., Ltd., Seoul (KR)

(72) Inventor: Jong-Hyeok Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 13/897,315

(22) Filed: May 17, 2013

(65) Prior Publication Data

US 2013/0313789 A1 Nov. 28, 2013

(30) Foreign Application Priority Data

May 22, 2012 (KR) .................. 10-2012-0053997

(51) Int. Cl.
*F16J 15/14* (2006.01)
*F16J 15/06* (2006.01)
*F16J 15/08* (2006.01)

(52) U.S. Cl.
CPC .............. *F16J 15/06* (2013.01); *F16J 15/0818* (2013.01); *Y02T 10/7077* (2013.01); *Y02T 10/7241* (2013.01); *Y02T 10/7216* (2013.01)
USPC .......................................................... 277/590

(58) Field of Classification Search
USPC .................................................. 277/590–598
See application file for complete search history.

(56) References Cited

U.S. PATENT DOCUMENTS

2007/0001405 A1* 1/2007 Watanabe et al. ............. 277/598

FOREIGN PATENT DOCUMENTS

KR 10-2010-0126087 A 12/2010

* cited by examiner

*Primary Examiner* — Gilbert Lee
(74) *Attorney, Agent, or Firm* — Knobbe Martens Olson & Bear LLP

(57) ABSTRACT

Disclosed herein is a gasket mounted between power modules for separating a coolant passage, the gasket is inserted between an upper power module formed with a cooling passage on a lower surface thereof and a lower power module formed with a cooling passage on an upper surface to seal coupling surfaces of the upper power module and the lower power module, wherein a circumference of an upper surface of the gasket is closely attached on the lower surface of the upper power module, a circumference of a lower surface of the gasket is closely attached on the upper surface of the lower power module, and the cooling passage of the upper power module and the cooling passage of the lower power module are separated up and down by the gasket.

16 Claims, 7 Drawing Sheets

C-C

GASKET MOUNTED BETWEEN POWER MODULES FOR SEPARATING COOLANT PASSAGE

CROSS-REFERENCE TO RELATED APPLICATIONS

This application claims priority to Korean Patent Application No. 10-2012-0053997, filed on May 22, 2012, which is incorporated herein by reference in its entirety.

BACKGROUND

1. Field

Exemplary embodiments of the present invention relate to a gasket applied to an eco-friendly vehicle; and, particularly, to a gasket mounted between power modules for separating a coolant passage, which has both a function to separate a coolant passage and a function to prevent a coolant leak.

2. Discussion of the Related Technology

An eco-friendly vehicle such as a hybrid vehicle or an electric vehicle generates power through a drive motor, and includes the drive motor and power modules, such as inverters, LDCs (Low DC/DC Converters), and high-voltage batteries, to power the drive motor.

Since such power modules have heating elements such as a variety of switching elements, transformers, and IGBTs (Insulated Gate Bipolar mode Transistors), there is a need for a cooling device to cool heat generated by operations of the power modules.

A water cooling device and an air cooling device are applied depending on a position in the vehicle. For example, the water cooling device is applied to a so-called engine room in the front of the vehicle, whereas the air cooling device is applied to a trunk room in the rear of the vehicle.

The water cooling device, which circulates a coolant, is applied to the power modules such as the LDCs and the inverters mounted in the front of the vehicle. For the purpose of size reduction of the cooling device, an improvement in cooling efficiency thereof, and the like, a cooling passage is shared between two power modules which are arranged adjacent to each other.

For example, as shown in FIG. 1, cooling passages are respectively formed on a lower surface of an LDC 10 and an upper surface of an inverter 20, and then a passage separation plate 130 is mounted between the cooling passages. Subsequently, the LDC 10 is bonded to the inverter 20 by applying a sealant 140 on an interface surface therebetween. A coolant introduced from the outside flows through the cooling passage formed on the lower surface of the LDC 10 and the cooling passage formed on the upper surface of the inverter 20, which are separated up and down by the passage separation plate 130, and is then gathered to be discharged to the outside. Consequently, it may be possible to obtain an increase in optimization and efficiency. Here, the cooling passage formed on the upper surface of the inverter 20 may be provided with a heat radiation fin, and cooling passage formed on the lower surface of the LDC 10 may also be provided with a heat radiation fin, as shown in FIG. 1.

However, according to a seal structure of the cooling passage in the eco-friendly vehicle of the prior art as described above, operation pace is deteriorated by sealing the cooling passage using the sealant 140 which needs a considerable time during curing after being applied on the interface surface, also it is difficult to eliminate the sealant 140 at the time of generation of seal failure. Therefore, there is a problem in that the LDC 10 or the inverter 20 is easily damaged in the course of eliminating the sealant 140, and thus the damaged LDC 10 or inverter 20 should be discarded.

In addition, there is a need to precisely seat the special passage separation plate 130 between the LDC 10 and the inverter 20, and this is performed separately from the seal operation using the sealant 140. Accordingly, the operation to mount the passage separation plate 130 is additionally involved, thereby deteriorating operating efficiency.

SUMMARY

An embodiment of the present invention is directed to a gasket mounted between power modules for separating a coolant passage, which is mounted between two power modules sharing a cooling passage in an eco-friendly vehicle and has functions for separating the cooling passage and for sealing so that a coolant does not leak.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, in a gasket mounted between power modules for separating a coolant passage, the gasket is inserted between an upper power module formed with a cooling passage on a lower surface thereof and a lower power module formed with a cooling passage on an upper surface to seal coupling surfaces of the upper power module and the lower power module, wherein a circumference of an upper surface of the gasket is closely attached on the lower surface of the upper power module, a circumference of a lower surface of the gasket is closely attached on the upper surface of the lower power module, and the cooling passage of the upper power module and the cooling passage of the lower power module are separated up and down by the gasket.

The gasket may be continuously formed with an outer seal wall which protrudes to be closely attached on the lower surface of the upper power module along the circumference of the upper surface of the gasket so as to prevent a leak of a coolant, and the lower surface of the gasket may be closely attached on the upper surface of the lower power module.

The gasket may be formed therein with an inner guide wall which protrudes from a surface of the gasket with respect to a range of a predetermined length of the gasket to be closely attached on the lower surface of the upper power module so as to guide a flow of a coolant.

The inner guide wall may be provided in plural numbers so as to guide the flow of the coolant.

The inner guide walls may be arranged in parallel with each other.

The gasket may be formed therein with at least one flow control protrusion which protrudes from a surface of the gasket and controls a flow of a coolant.

The flow control protrusion may protrude from the surface of the gasket, and a gap may be formed between an upper end of the flow control protrusion and the lower surface of the upper power module.

The flow control protrusions may be arranged in the form of rows and columns.

The gasket may be formed, at one side thereof, with a coolant separating port which passes through the upper surface and the lower surface of the gasket so that a coolant introduced from the outside is separated into an upper portion of a lower portion of the gasket, and the gasket may be formed, at the other side thereof, with a coolant gathering port which passes through the upper surface and the lower surface of the gasket so that the separated coolant is gathered.

The upper power module may be an LDC (Low DC/DC Converter), and the lower power module may be an inverter.

The gasket may be made of SPCC (Steel Plate Cold Commercial).

The gasket may be plated with zinc for corrosion proof treatment.

The gasket may be made of stainless steel plate.

The gasket may be mounted on a hybrid vehicle or an electric vehicle.

DESCRIPTION OF EMBODIMENTS

Figure 1:
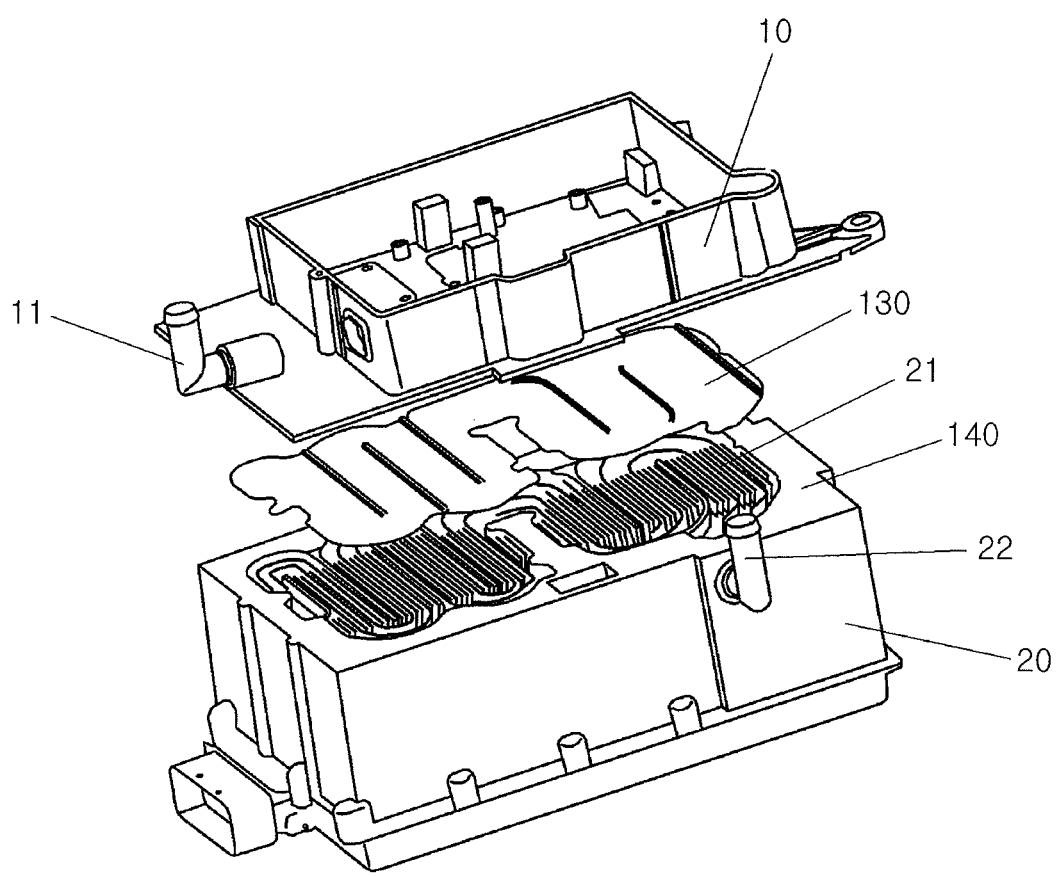
FIG. 1 is an exploded schematic perspective view for explaining a method of separating and sealing a passage between an upper power module and a lower power module using a passage separation plate and a sealant of the prior art.
Figure 2:
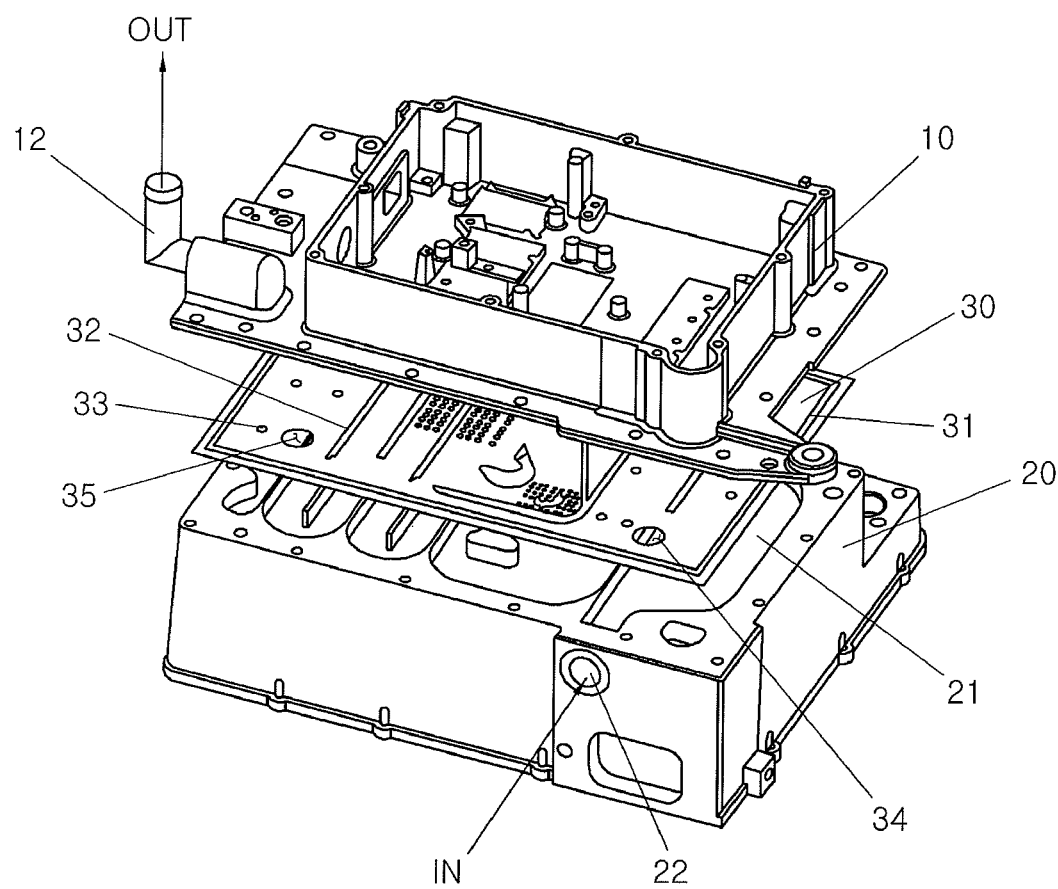
FIG. 2 is an exploded perspective view for explaining a method of separating and sealing a passage between an upper power module and a lower power module by applying a gasket having a passage separation function according to an embodiment of the present invention.

A gasket mounted between power modules for separating a coolant passage according to exemplary embodiments of the present invention will be described below in more detail with reference to the accompanying drawings.

The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

A gasket mounted between power modules for separating a coolant passage according to an embodiment of the present invention is mounted between two power modules sharing a cooling passage and separates the cooling passage. Hereinafter, the following description will be given of an LDC 10 and an inverter 20 as an example of the respective power modules which are arranged up and down to be coupled with each other and share the cooling passage formed therebetween.

Figure 3:
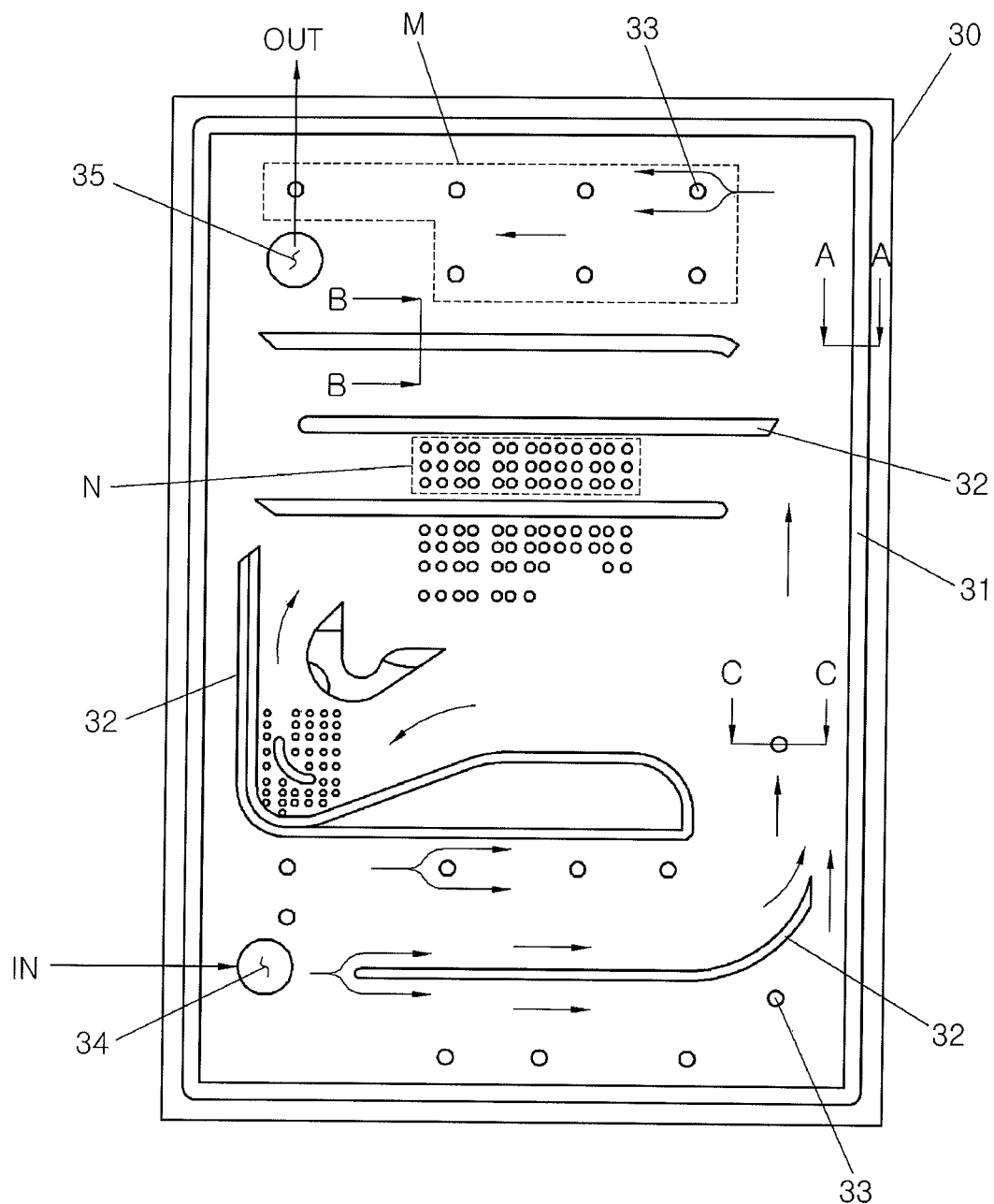
FIG. 3 is a top view illustrating the gasket having the passage separation function according to the embodiment of the present invention.

As shown in FIG. 3, the gasket 30 is inserted between the LDC 10 formed with a cooling passage on a lower surface thereof and the inverter 20 formed with a cooling passage on an upper surface to seal coupling surfaces of the LDC 10 and the inverter 20. The gasket 30 includes an outer seal wall 31 which is protrudingly formed to be closely attached on the lower surface of the upper power module 10 along a circumference of the gasket 30, inner guide walls 32 which are protrudingly formed to be closely attached on the lower surface of the upper power module 10 with respect to a range of a predetermined length within the gasket 30, and flow control protrusions 33 which protrude from the gasket 30 so that a flowing coolant generates an eddy.

The gasket 30 mounted between power modules for separating a coolant passage according to the embodiment of the present invention allows the coolant to be separated into and flow through an upper portion and a lower portion of the gasket 30 by covering the lower surface of the LDC 10 formed with the cooling passage and the upper surface of the inverter 20 formed with the cooling passage. The cooling passage 21 formed in the inverter 20 is preferably formed with cooling fin (not shown). As occasion demands, the cooling passage 21 formed in the LDC 10 may also be formed with a cooling fin. The existence of the cooling fin is determined depending on a heating value of the corresponding power module.

Figure 4:
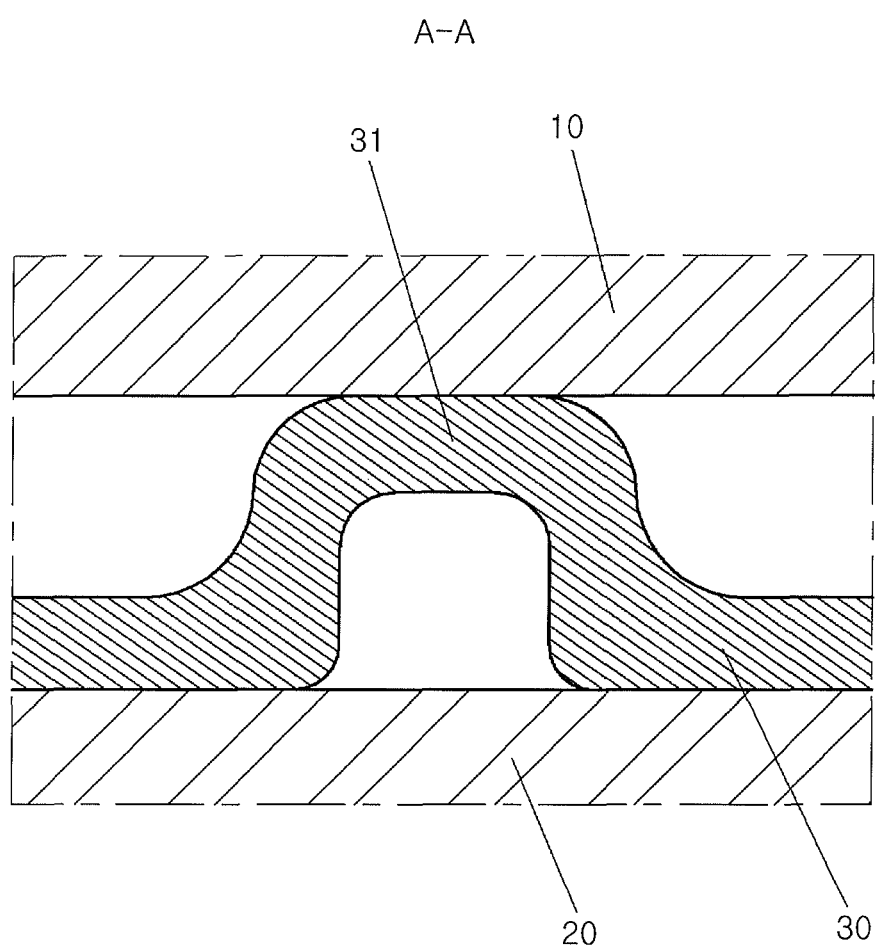
FIG. 4 is a cross-sectional view taken along line A-A of FIG. 3.
Figure 5:
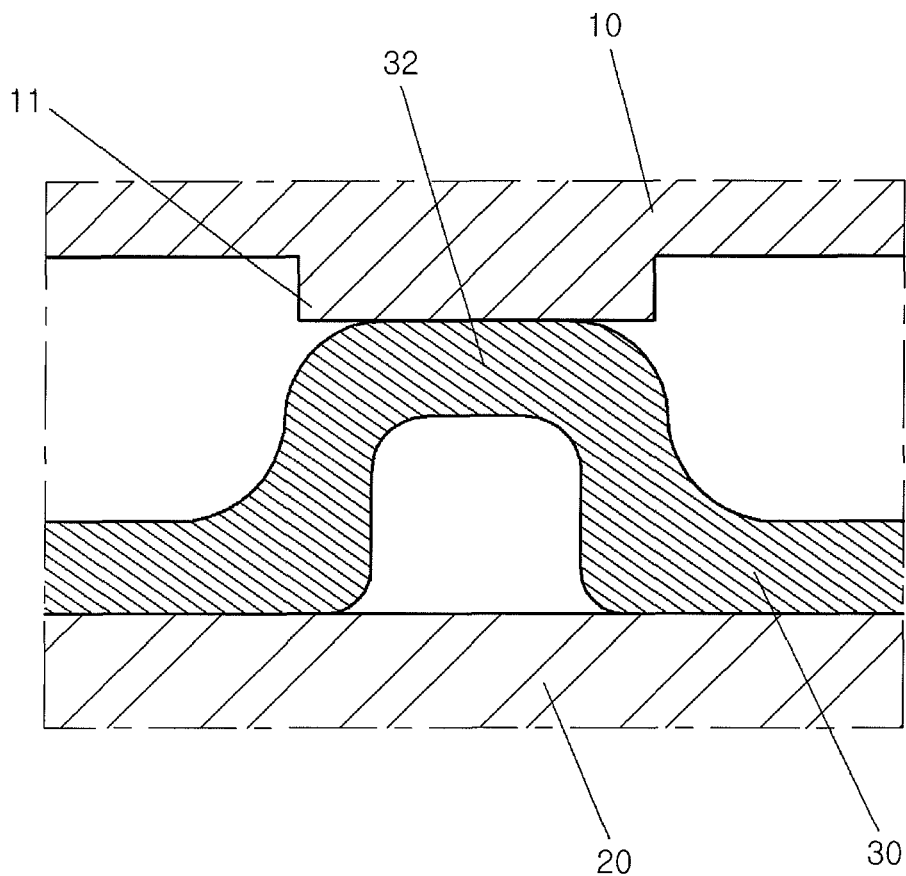
FIG. 5 is a cross-sectional view taken along line B-B of FIG. 3.

The outer seal wall 31 is formed protrudingly from a surface of the gasket 30 so as to be convex along the circumference thereof. As a cross-sectional view of FIG. 4, the outer seal wall 31 protrudes at an upper end thereof to be closely attached on the lower surface of the LDC 10, and is continuously formed along the circumference of the gasket 30. Since a lower surface of the gasket 30 corresponding to a portion formed with the outer seal wall 31 is closely attached on the upper surface of the inverter 20 and the upper end of the outer seal wall 31 is closely attached on the lower surface of the LDC 10, it may be possible to seal so that the coolant flowing the cooling passage does not leak to the outside.

The inner guide walls 32 are formed within the gasket 30 to block the flow of the coolant through the inner guide walls 32, thereby controlling the flow of the coolant. That is, since the inner guide walls 32 protrude at respective upper ends thereof to be closely attached on the lower surface of the LDC 10, the coolant does not pass through the upper ends of the inner guide walls 32. Accordingly, the inner guide walls 32 may control the flow of the coolant flowing between the upper surface of the gasket 30 and the lower surface of the LDC 10.

Particularly, the inner guide walls 32 are formed to correspond to a shape of the cooling passage formed on the lower surface of the upper power module, namely, the LDC 10. The inner guide walls 32 preferably come into contact with protrusion portions 11 which protrude from the LDC 10 in order to form the cooling passage in the LDC 10.

As shown in FIG. 3, each of the inner guide walls 32 is protrudingly formed in a range of a predetermined length within the gasket 30, and the plural inner guide walls 32 are arranged within the gasket 30, thereby allowing the coolant to flow along the inner guide walls 32.

In addition, the plural inner guide walls 32 are arranged in parallel with each other so that the coolant sufficiently exchanges heat with the LDC 10 or the inverter 20, thereby allowing the coolant to sufficiently flow in a width direction of each of the LDC 10 and the inverter 20.

Figure 6:
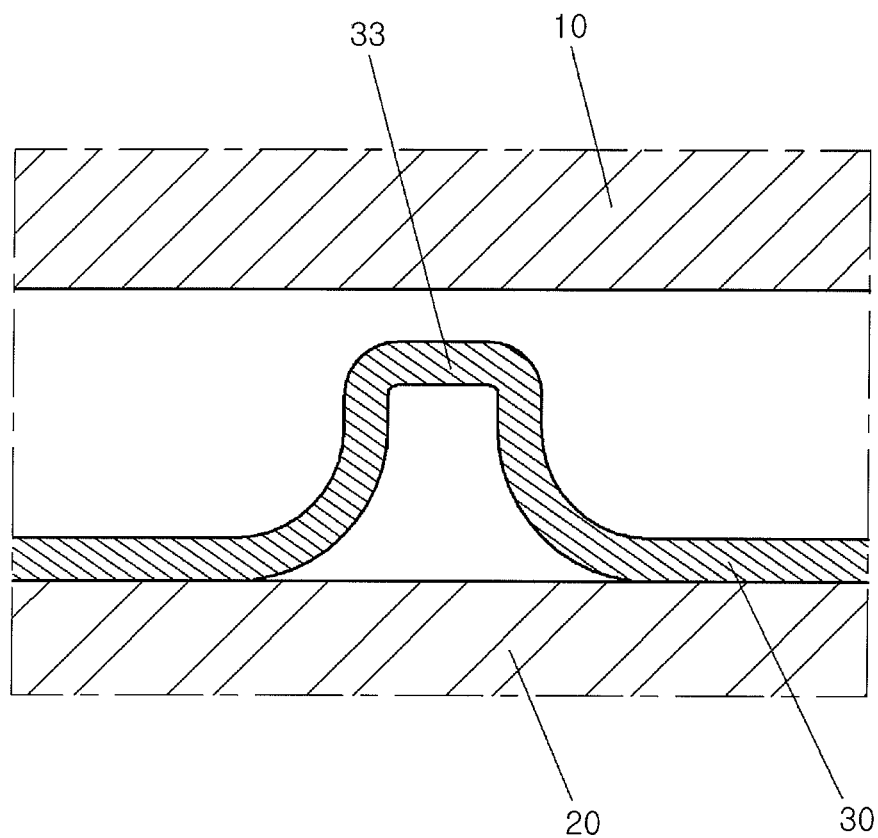
FIG. 6 is a cross-sectional view taken along line C-C of FIG. 3.

The flow control protrusions 33 are formed to protrude upwards from the surface of the gasket 30. While the flow control protrusions 33 may protrude to be closely attached, at respective upper ends thereof, on the lower surface of the LDC 10, similarly to the outer seal wall 31 or the inner guide walls 32, each of the flow control protrusions 33 is preferably formed to have a gap so as not to be closely attached on the lower surface of the LDC 10, as shown in FIG. 6.

Due to the flow control protrusions 33, the flowing coolant flows around the flow control protrusions 33 or flows over the flow control protrusions 33, thereby generating turbulence. Accordingly, the flow control protrusions 33 may improve cooling efficiency.

Therefore, by properly disposing the flow control protrusions 33 at specific portions which generate much heat in the LDC 10 or the inverter 20, the heat generated by the LDC 10 or the inverter 20 may be rapidly emitted.

Here, each of the flow control protrusions 33 may be disposed to be sufficiently spaced apart from the adjacent flow control protrusion 33 as a region indicated by "M" in FIG. 3. In addition, the flow control protrusions 33 may also be disposed to be arranged tightly, particularly in the form of rows and columns as a region indicated by "N" in FIG. 3, and may be formed to have sizes different from each other.

The gasket 30 is formed, at respective sides thereof, with a coolant separating port 34 and a coolant gathering port 35 which may pass through the gasket 30 and through which the upper and lower portions of the gasket 30 may communicate with each other. Consequently, after the coolant introduced from the outside is separated by the coolant separating port 34 to flow through the upper portion and the lower portion of the gasket 30, the coolant is gathered through the coolant gathering port 35 and is then discharged to the outside.

Since the LDC 10 and the inverter 20 preferably have one inlet 22 and one outlet 12, respectively when they are assembled, the coolant separating port 34 and the coolant gathering port 35 are formed in the gasket 30 so that the inlet 22 and the outlet 12 are shared.

The gasket 30 is made of metal plate, preferably SPCC (Steel Plate Cold Commercial). The SPCC has superior workability, and therefore it may be possible to easily manufacture the gasket 30 through press working.

Particularly, in order to prevent the surface of the gasket 30 from being corroded, it is preferable to perform corrosion-proof treatment by plating the surface with zinc (Zn).

Alternatively, the gasket 30 may also be made of stainless steel plate. In this case, the separate corrosion-proof treatment may not be performed with respect to the gasket 30.

The following description will be given of a course in which the coolant flows by the gasket mounted between power modules for separating a coolant passage, which has the above-mentioned configuration according to the embodiment of the present invention.

The LDC 10 is coupled to the inverter 20 in a state of seating the gasket 30 between the LDC 10 and the inverter 20. When the LDC 10 is coupled to the inverter 20, the outer seal wall 31 formed around the gasket 30 is closely attached between the coupling surfaces around the LDC 10 and the inverter 20, thereby preventing the coolant flowing therein from leaking.

In a state in which the assembly of the gasket 30 is completed, when the coolant is introduced through the inlet 22, the coolant flows between the LDC 10 and the inverter 20 and is then discharged through the outlet 12.

Figure 7:
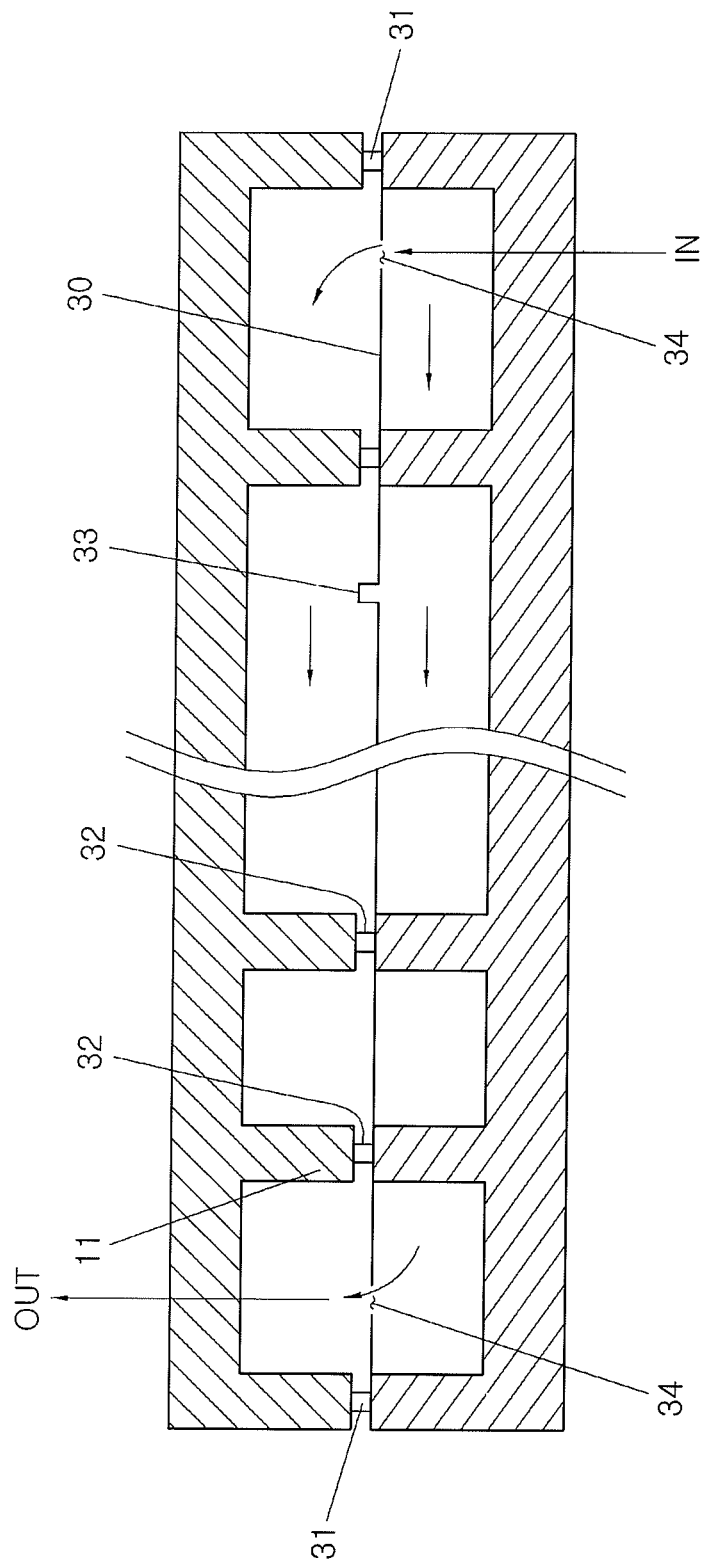
FIG. 7 is a conceptual view illustrating that a coolant is gathered and discharged after being separated into and flowing through an upper passage and a lower passage of the gasket having the passage separation function according to the embodiment of the present invention.

For example, as shown in FIG. 7, when the coolant is introduced through the inlet 22 formed in the inverter 20, a portion of the introduced coolant flows along the cooling passage 21 formed on the upper surface of the inverter 20, and the remainder flows to the upper portion of the gasket 30 through the coolant separating port 34 thereof to flow along the cooling passage formed on the lower surface of the LDC 10. The coolant, which is separated and flows by the gasket 30, is discharged through the outlet 12 to the outside, after the coolant, which flows along the cooling passage formed on the upper surface of the inverter 20 through the coolant gathering port 35 of the gasket 30, is gathered with the coolant which flows to the upper portion of the gasket 30 and then flows on the upper surface thereof.

Meanwhile, the flow of the coolant which is separated up and down is determined by the cooling passages of the LDC 10 and the inverter 20. Referring to the flow of the coolant flowing on the upper surface of the gasket 30 using FIG. 3, the coolant separated by the coolant separating port 34 is branched or guided by the inner guide walls 32, and turbulence is generated by the flow control protrusions 33, thereby promoting cooling efficiency.

Accordingly, since the gasket 30 has both of a function to separate a coolant passage and a function to prevent a coolant leak, it may be possible to accomplish prevention of the coolant leak and separation of coolant passage only by mounting the gasket 30.

In accordance with a gasket mounted between power modules for separating a coolant passage according to the exemplary embodiments of the present invention, functions to separate a cooling passage and to prevent a coolant leak between two power modules sharing the cooling passage may be accomplished by the gasket which is a single part.

Since the coolant leak is prevented by the gasket, it may be possible to improve productivity without waiting until a sealant is applied and then cured.

In the prior art, parts such as an LDC and an inverter to which the sealant is applied have been discarded because it is difficult to eliminate the applied sealant at the time of generation of seal failure in the prior art. However, in accordance with the exemplary embodiments of the present invention, since the gasket may be remounted or replaced with a new one, it may be possible to cope actively with generation of failure and reduce the number of the parts to be discarded.

In addition, it may be possible to improve cooling efficiency by controlling the flow of a coolant by means of a protruded inner guide wall and a flow control protrusion.

While the present invention has been described with respect to the specific embodiments, it will be apparent to those skilled in the art that various changes and modifications may be made without departing from the spirit and scope of the invention as defined in the following claims.

What is claimed is:

1. A gasket for use in a vehicle and to be mounted between upper and lower power modules, a bottom of the upper power module comprising a first recessed surface and a first periphery surrounding the first recessed surface, a top of the lower power module comprising a second recessed surface and a second periphery surrounding the second recessed surface, the gasket comprising a plate shaped body which comprises:
    an upper surface configured to be liquid-tightly attached to the first periphery of the bottom of the upper power module such that a first coolant passage is formed between the upper surface and the first recessed surface of the upper power module,
    a lower surface configured to be liquid-tightly attached to the second periphery of the top of the lower power module such that a second coolant passage is formed between the lower surface and the second recessed surface of the lower power module, and
    at least one flow control structure formed on the upper surface and protruding toward the first recessed surface while not contacting the first recessed surface.

2. The gasket of claim 1, wherein the gasket is formed as a single piece, wherein the gasket comprises an outer seal wall which protrudes from the upper surface and is configured to make a liquid-tight contact with the bottom of the upper power module.

3. The gasket of claim 2, wherein the gasket comprises at least one inner guide wall which protrudes from the upper surface and is configured to make a liquid-tight contact with the bottom of the upper power module.

4. The gasket of claim 3, wherein the at least one inner guide wall comprises two or more inner guide walls.

5. The gasket of claim 4, wherein the two or more inner guide walls are arranged in parallel with each other.

6. The gasket of claim 5, wherein the gasket is plated with zinc for corrosion proof treatment.

7. The gasket of claim 2, wherein the at least one flow control structure comprises a plurality of flow control protrusions arranged in the form of rows and columns.

8. The gasket of claim 1, wherein the gasket comprises at least one inner guide wall which protrudes from the upper surface and is configured to make a liquid-tight contact with the bottom of the upper power module.

9. The gasket of claim 8, wherein the at least one inner guide wall comprises two or more inner guide walls.

10. The gasket of claim 9, wherein the two or more inner guide walls are arranged in parallel with each other.

11. The gasket of claim 1, wherein the at least one flow control structure comprises a plurality of flow control protrusions arranged in the form of rows and columns.

12. The gasket of claim 1,
wherein the gasket comprises a coolant separating port through which the first coolant passage and the second coolant passage are in fluid communication with each other such that a coolant flow is separated into a first coolant stream through the first coolant passage and a second coolant stream through the second coolant passage at the coolant separating port;
wherein the gasket further comprises a coolant gathering port through which the first coolant passage and the second coolant passage are in fluid communication with each other such that the first coolant stream and the second coolant stream are gathered at the coolant gathering port.

13. The gasket of claim 1, wherein the upper power module is an LDC (Low DC/DC Converter), and the lower power module is an inverter.

14. The gasket of claim 1, wherein the gasket is made of SPCC (Steel Plate Cold Commercial).

15. The gasket of claim 1, wherein the gasket is made of stainless steel plate.

16. The gasket of claim 1, wherein the gasket is equipped in a hybrid vehicle or an electric vehicle.

* * * * *